No. 761,678. PATENTED JUNE 7, 1904.
A. HYDE.
OIL LAMP.
APPLICATION FILED DEC. 1, 1903.
NO MODEL. 2 SHEETS—SHEET 1.
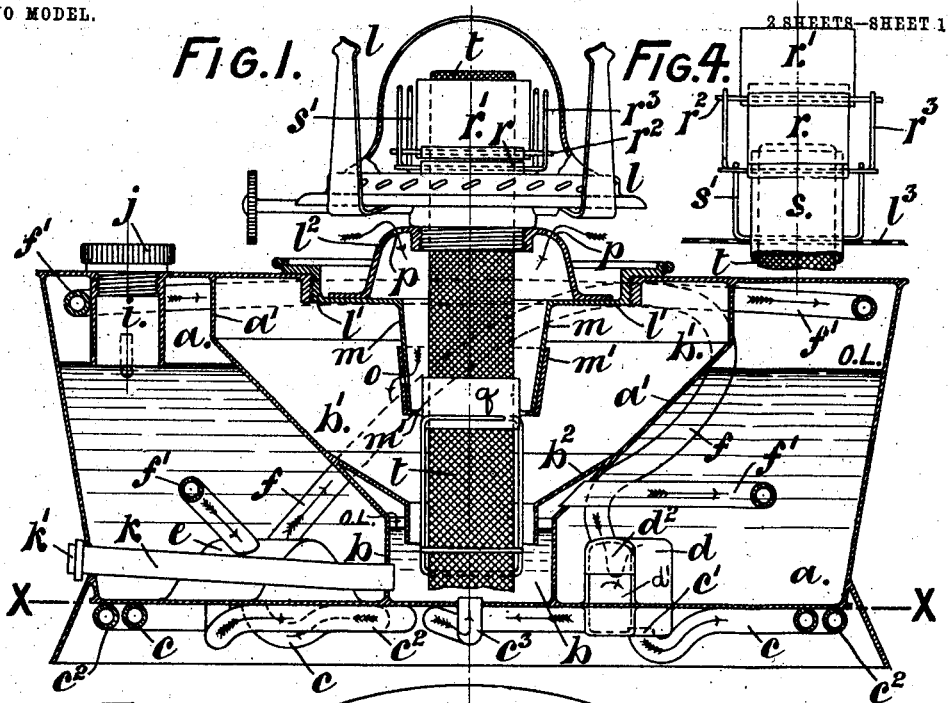
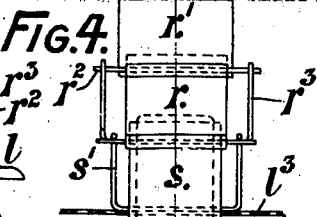
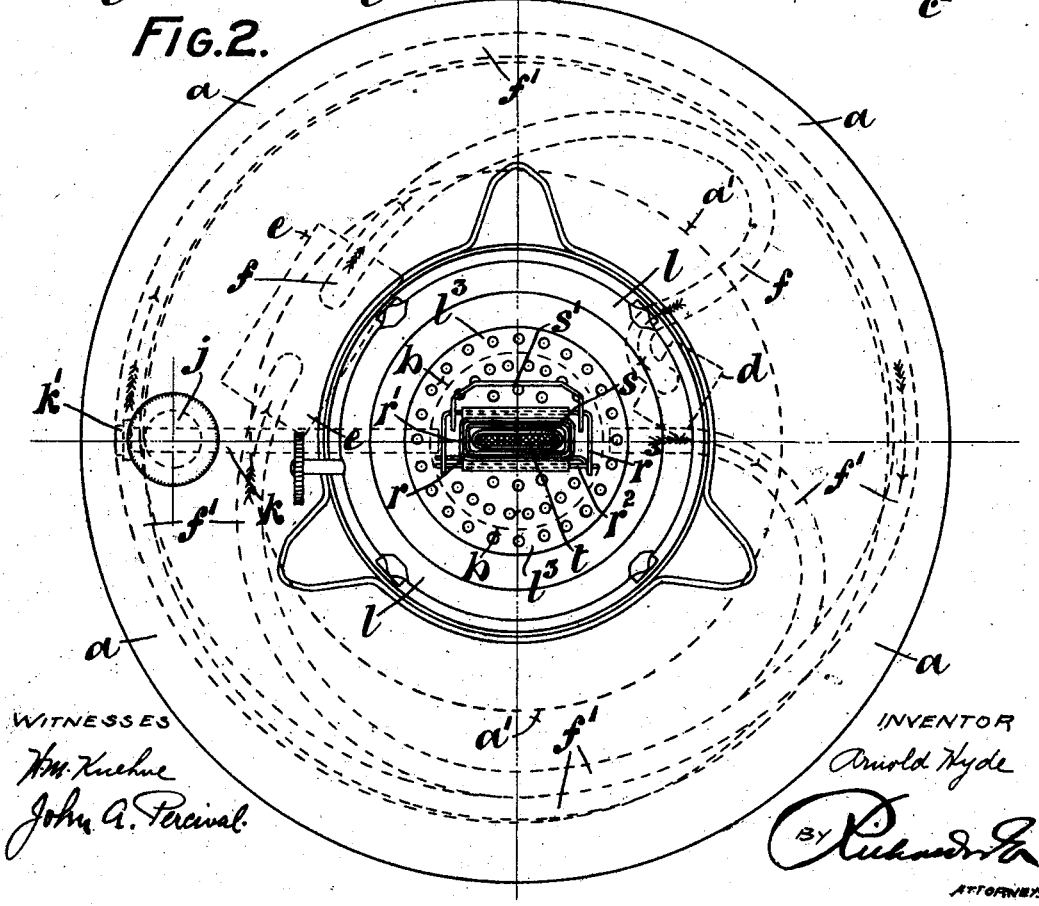
WITNESSES
INVENTOR
Arnold Hyde
BY
ATTORNEYS No. 761,678. PATENTED JUNE 7, 1904.
A. HYDE.
OIL LAMP.
APPLICATION FILED DEC. 1, 1903.
NO MODEL.
2 SHEETS—SHEET 2.
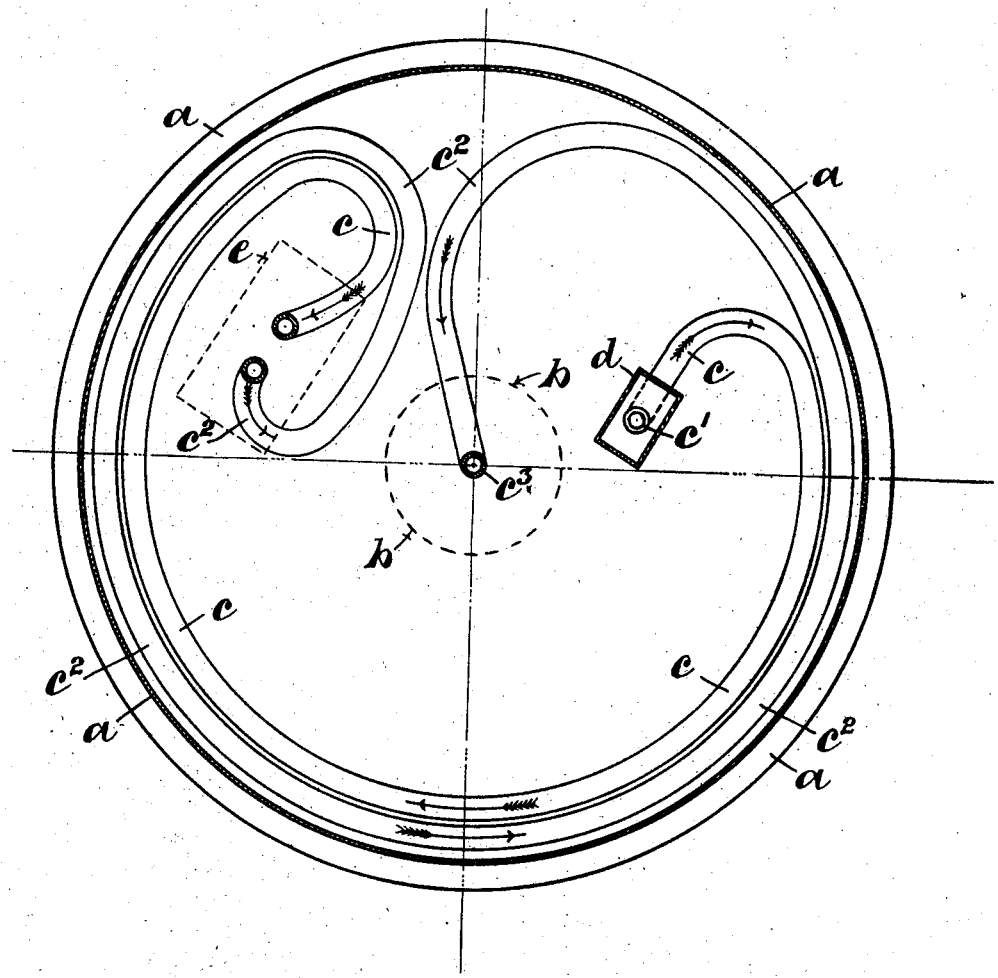
FIG. 3.
WITNESSES
INVENTOR
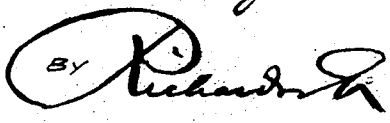
ATTORNEYS No. 761,678. Patented June 7, 1904.

UNITED STATES PATENT OFFICE.

ARNOLD HYDE, OF FORMBY, ENGLAND.

OIL-LAMP.

SPECIFICATION forming part of Letters Patent No. 761,678, dated June 7, 1904.

Application filed December 1, 1903. Serial No. 183,384. (No model.)

*To all whom it may concern:*

Be it known that I, ARNOLD HYDE, a subject of the King of England, and a resident of Formby, in the county of Lancaster, England, have invented certain new and useful Improvements in Oil-Lamps, of which the following is a specification.

This invention has primarily for its object a paraffin or petroleum lamp from which the oil cannot escape and which will not explode when thrown or upset, and the light becomes extinguished.

The invention will be described with the aid of the accompanying drawings, in which—

Figure 1 is a cross-section showing the lamp. Fig. 2 is a plan, and Fig. 3 is a cross-section taken at the line X X, Fig. 1. Fig. 4 is a view showing the extinguisher in detail.

The lamp shown comprises an annular vessel or well $a$, within the inner wall $a'$ of which is the inner well $b$, this well being adapted to always contain a uniform and small quantity of oil so long as there is any within the outer vessel $a$. The oil is conveyed indirectly from the outer vessel $a$ to the inner well $b$ by a pipe $c$, one end, $c'$, of which opens from the bottom of the cistern $d$ in the bottom of the outer vessel $a$, and the other end is connected to an air-chamber $e$ in the bottom of the vessel $a$, the bottom of this vessel being connected with the bottom of the well $b$ by a pipe $c^2$, the well end of which is designated $c^3$. The cistern $d$ has another pipe, $f$, connected with it, which supplies air to it, (the other pipe, $c$, connected with it, supplying oil to the well $b$,) this pipe being connected also to the upper part of the air-chamber $e$, which is in connection with the well $b$ by the pipe $f'$. The pipes $f$ and $f'$, as will be seen, are bent or carried up in a curved manner, according to the shape of the outer vessel, so as to prevent any oil passing by way of them from either the air-chamber $e$ or the cistern $d$ and so that they will not become choked with oil. The entrance of the pipe $f'$ into the upper portion $b'$ of the well $b$ is under an annular curtain $b^2$, which dips down into the well $b$. The opening into the cistern $d$ from the outer vessel $a$ is by the aperture $d'$ in the end $d^2$ of the cistern, and the air, which is admitted to the closed upper portion of the vessel $a$ to allow the oil to pass to the well by way of this cistern and the pipes $c$ $c^2$, will pass under the edge of this end $d^2$ above the hole or aperture $d'$.

The oil is charged into the vessel $a$ through a filling-opening $i$, and when filled this opening is closed by an air-tight screw-cap or equivalent stopper $j$. In filling when the cap $j$ is off the oil in the inner well $b$ will rise to the same height as the oil in $a$, and to lower this oil in the inner well to the normal level required the cap $j$ is screwed down and the chamber $a$ closed, while the cap $k'$ on the end of the pipe $k$, extending between the bottom of the inner well $b$ and the outside of the lamp, is taken off and the surplus oil run off from the inner well. After this the cap $k'$ is replaced, and the lamp is in its normal condition for working.

In connection with the screwed portion or end $l'$ of the burner $l$ there is a circular screen $m$, which extends down into the upper part $b'$ of the well $b$, whereby when the lamp is upset or thrown the oil within the well $b$ will run behind the screen $m$ and will not escape by way of the air-opening $o$, through which air enters the well from the outside by way of the apertures $p$.

The wick-tube $q$, through which the wick passes from the screen $m$ from the well $b$ to the burner, is attached to the removable cap $m'$ of the screen $m$, which forms part thereof. The oil within the well $b$ is kept cool by means of the perforated part $p$ or gauze around the bottom of the body $l^2$, in which the burner $l$ screws.

The extinguisher, which is shown in Figs. 1, 2, and in Fig. 4 extended, consists of a double slide $r$ $r'$, placed over the tube $s$, through which the wick passes. The upper part $r'$ of this tube is prevented from falling off the part $r$ by pins $r^2$, which extend through loops $r^3$ on the lower slide $r$, such lower slide being prevented from falling off the wick-tube $s$ by loops or hooks $s'$, fastened to the tube $s$ or the plate $l^3$ of the burner. When the lamp turns over, this double slide of itself slides out and extinguishes the light.

In action as the oil is taken from the well $b$ by the wick $t$ the pressure within the top of the chamber $a$ is reduced as the level in $b$ falls, and when the oil in well $b$ falls below the neck of $b^2$ the external air has access to the pipe $f'$, and this air forces itself, by way of the pipes $f'$, air-chamber $e$, and pipe $f$, into the top of the cistern $d$, and thence by way of the opening $d'$ into the space above the oil in $a$. When this takes place, the oil is free to flow from this chamber $a$, by way of the opening $d'$ in the cistern $d$ and the pipes $c\ c^2$, into the well $b$, and when the fluid-balance is restored the oil ceases to flow. Thus the well $b$ is constantly kept supplied with a small depth of oil in the bottom of the well $b$, and this well being small only a very small quantity of oil is ever in communication with the burner portion and wick. Consequently the liability of explosions either by heat or by upsetting is rendered practically impossible, and a perfect safety-lamp is provided.

Having now particularly described my invention, what I claim as new, and desire to secure by Letters Patent, is—

1. In an oil-lamp, an outer closed annular oil-container $a$; a comparatively small well $b$ within same; a cistern $d$ in the bottom of the container $a$, having a communicating opening $d'$ with the container; air-inlet means connecting the well $b$ above the level of oil therein, with the upper part of the cistern $d$; and oil-supply means connecting the bottom of the cistern $d$ with the lower part of the well $b$; substantially as set forth.

2. In an oil-lamp, an outer closed annular oil-container $a$; a comparatively small well $b$ within said container; a cistern $d$ in the bottom of the container $a$, having a communicating opening $d'$ with the container; an air-chamber $e$ in the bottom of the container $a$; a pipe $f$ connecting the upper part of the cistern $d$ and the chamber $e$, and extending upward above same; a pipe $f'$ connecting the upper part of the chamber $e$, and the well $b$ above the level of oil therein; a pipe $c$ connecting the bottom of the cistern $d$ and the bottom of the chamber $e$; and a pipe $c^2$ connecting the bottom of the chamber $e$ and the well $b$; substantially as set forth.

3. In an oil-lamp, an outer closed annular oil-container $a$, a comparatively small closed well $b$ within said container; a cistern $d$ in the bottom of the container $a$, having a communicating opening $d'$ with the container; air-inlet means connecting the well $b$ above the level of oil therein, with the upper part of the cistern $d$, and oil-supply means connecting the bottom of the cistern $d$ with the lower part of the well $b$; a pendent chamber $m$ below the burner, projecting into the upper part $b'$ of the well, and having a tube $q$ on the bottom of same, through which the wick is passed; and an air-opening $o$ in the side of said chamber, said chamber preventing the escape of oil when the lamp is upset, substantially as described.

In witness whereof I have hereunto set my hand in presence of two witnesses.

ARNOLD HYDE.

Witnesses:
S. GOODALL,
GUY OKE.